United States Patent
Takahashi (10) Patent No.: US 9,868,261 B2
(45) Date of Patent: Jan. 16, 2018

(54) VENT PIECE, TIRE VULCANIZATION MOLD WITH VENT PIECE, AND TIRE MANUFACTURED USING TIRE VULCANIZATION MOLD

(71) Applicant: SUMITOMO RUBBER INDUSTRIES LTD., Kobe-shi (JP)

(72) Inventor: Nobuaki Takahashi, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 277 days.

(21) Appl. No.: 14/714,831

(22) Filed: May 18, 2015

(65) Prior Publication Data

US 2015/0336343 A1 Nov. 26, 2015

(30) Foreign Application Priority Data

May 23, 2014 (JP) ................ 2014-107391

(51) Int. Cl.
*B29D 30/06* (2006.01)
*B29C 33/10* (2006.01)
*F16K 15/02* (2006.01)

(52) U.S. Cl.
CPC .......... *B29D 30/0662* (2013.01); *B29C 33/10* (2013.01); *B29D 30/0606* (2013.01); *F16K 15/026* (2013.01); *B29D 2030/0617* (2013.01); *Y10T 137/7904* (2015.04)

(58) Field of Classification Search
CPC ............ B29D 30/0606; B29D 30/0662; B29D 2030/0617; B29C 33/10
See application file for complete search history.

(56) References Cited

U.S. PATENT DOCUMENTS

| | | | | |
|---|---|---|---|---|
| 3,891,363 | A | * | 6/1975 | Sievers .................. B29C 33/10 249/141 |
| 3,931,381 | A | * | 1/1976 | Lindberg ................ B29C 33/60 106/271 |
| 4,492,554 | A | * | 1/1985 | Carter .................... B29C 33/10 425/28.1 |
| 4,740,145 | A | * | 4/1988 | Shurman ................ B29C 33/10 249/141 |
| 5,008,056 | A | * | 4/1991 | Kurtz ..................... B29C 47/28 264/130 |
| 2010/0230019 | A1 | * | 9/2010 | Sugata .................... B29C 33/10 152/151 |

FOREIGN PATENT DOCUMENTS

JP 2012-139830 A 7/2012

* cited by examiner

*Primary Examiner* — James Mackey
(74) *Attorney, Agent, or Firm* — Oblon, McClelland, Maier & Neustadt, L.L.P.

(57) ABSTRACT

A vent piece for a vent channel of a tire vulcanization mold includes a cylindrical tube formed to be installed in a cavity end portion of a vent channel of a tire vulcanization mold and having a through hole extending in axial direction of the channel, and a plug positioned in the through hole and moves between closed and open positions. The plug has a second bearing surface facing a first surface of the tube such that the second surface of the plug makes contact with the first surface to close the channel in the closed position and the second surface is separated from the first surface to open the channel in the open position, and the first and/or second surfaces has a film formed at least on a portion of the first and/or second surfaces such that the film reduces friction between the first and second surfaces.

20 Claims, 8 Drawing Sheets

VENT PIECE, TIRE VULCANIZATION MOLD WITH VENT PIECE, AND TIRE MANUFACTURED USING TIRE VULCANIZATION MOLD

CROSS-REFERENCE TO RELATED APPLICATIONS

The present application is based upon and claims the benefit of priority to Japanese Patent Application No. 2014-107391, filed May 23, 2014, the entire contents of which are incorporated herein by reference.

BACKGROUND OF THE INVENTION

Field of the Invention

The present invention relates to a vent piece installed in the vent channel of a tire vulcanization mold, to a tire vulcanization mold with the vent piece, and to a tire manufactured by using the tire vulcanization mold.

Description of Background Art

A vent piece may be installed in the vent channel of a tire vulcanization mold. For example, JP2012-139830A describes s a vent piece which holds a plug that is movable on the inner-side wall of a cylindrical tube to open/close the vent channel. The entire contents of this publication are incorporated herein by reference.

SUMMARY OF THE INVENTION

According to one aspect of the present invention, a vent piece for a vent channel of a tire vulcanization mold includes a cylindrical tube formed to be installed in a cavity end portion of a vent channel of a tire vulcanization mold and having a through hole extending in an axial direction of the vent channel, and a plug which is positioned in the through hole of the cylindrical tube and moves in the axial direction between a closed position and an open position. The cylindrical tube has a first bearing surface, the plug has a second bearing surface facing the first bearing surface of the cylindrical tube such that the second bearing surface of the plug makes contact with the first bearing surface to close the vent channel in the closed position and the second bearing surface is separated from the first bearing surface to open the vent channel in the open position, and the first bearing surface and/or the second bearing surface has a film formed at least on a portion of the first bearing surface and/or the second bearing surface such that the film reduces friction between the first bearing surface and the second bearing surface.

According to another aspect of the present invention, a method for manufacturing a tire includes positioning a raw tire in a vulcanization mold having a vent piece, and vulcanizing the raw tire in the tire vulcanization mold such that air trapped between the raw tire and the tire vulcanization mold is discharged through the vent piece. The vent piece of the tire vulcanization mold includes a cylindrical tube formed to be installed in a cavity end portion of a vent channel of the tire vulcanization mold and having a through hole extending in an axial direction of the vent channel, and a plug which is positioned in the through hole of the cylindrical tube and moves in the axial direction between a closed position and an open position, the cylindrical tube has a first bearing surface, the plug has a second bearing surface facing the first bearing surface of the cylindrical tube such that the second bearing surface of the plug makes contact with the first bearing surface to close the vent channel in the closed position and the second bearing surface is separated from the first bearing surface to open the vent channel in the open position, and the first bearing surface and/or the second bearing surface has a film formed at least on a portion of the first bearing surface and/or the second bearing surface such that the film reduces friction between the first bearing surface and the second bearing surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

Figure 1:
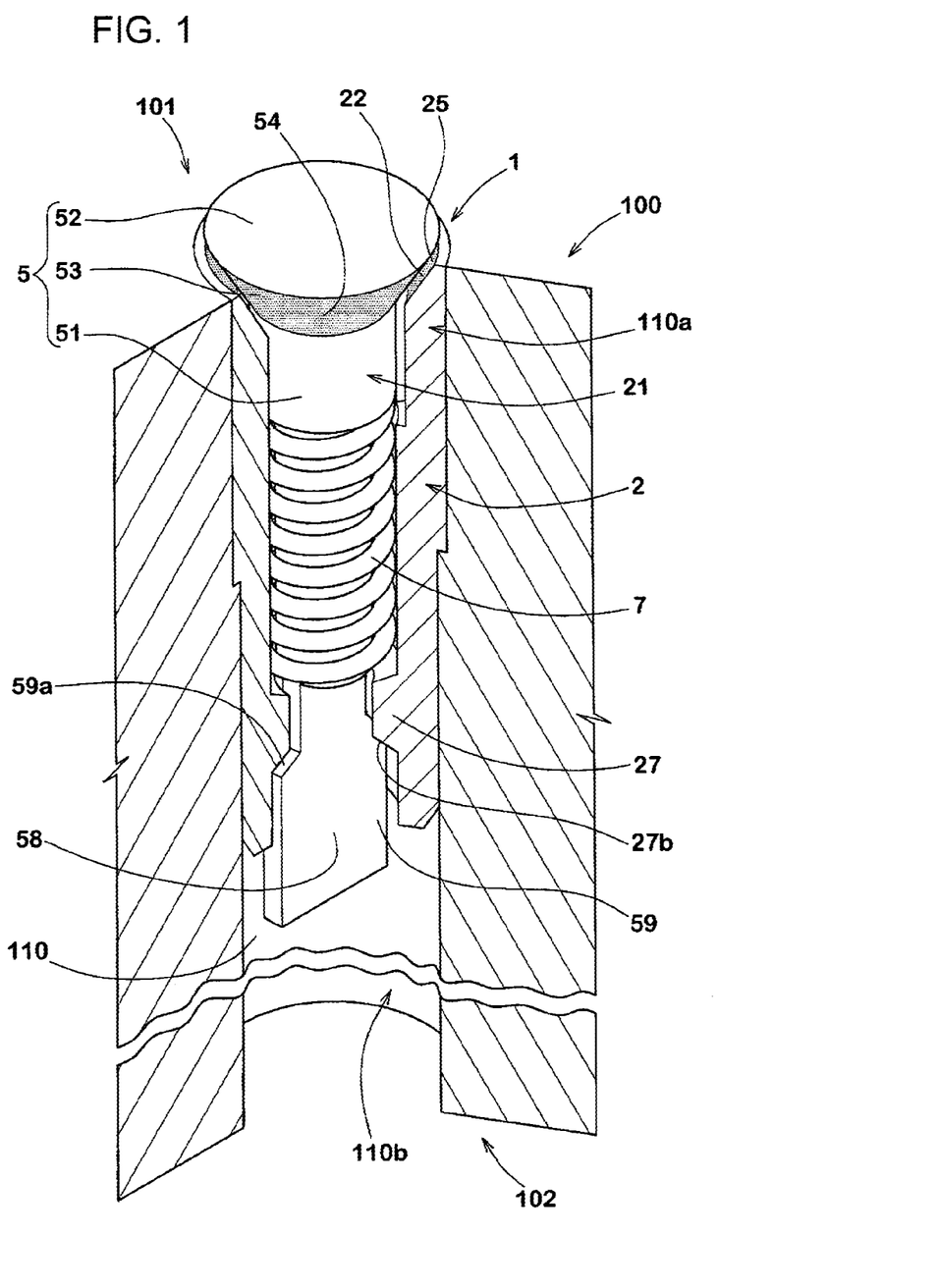
FIG. 1 is a partially developed perspective view of a vent piece according to an embodiment of the present invention.

FIG. 1 is a perspective view showing the structure of vent piece 1 of the present embodiment. As shown in FIG. 1, vent piece 1 of the present embodiment is installed in vent channel 110 formed in tire vulcanization mold 100. One end (110*a*) of vent channel 110 is connected to cavity space 101 of tire vulcanization mold 100. The other end (110*b*) of vent channel 110 is connected to exterior space 102 of tire vulcanization mold 100. At the initial vulcanization stage shortly after tire vulcanization mold 100 is closed, the air trapped between the raw tire and tire vulcanization mold 100 is discharged through vent channel 110 to exterior space 102 of tire vulcanization mold 100.

Vent piece 1 is provided with cylindrical tube 2 installed at one end (110*a*) of vent channel 110, and with plug 5 loaded in cylindrical tube 2.

Figure 2:
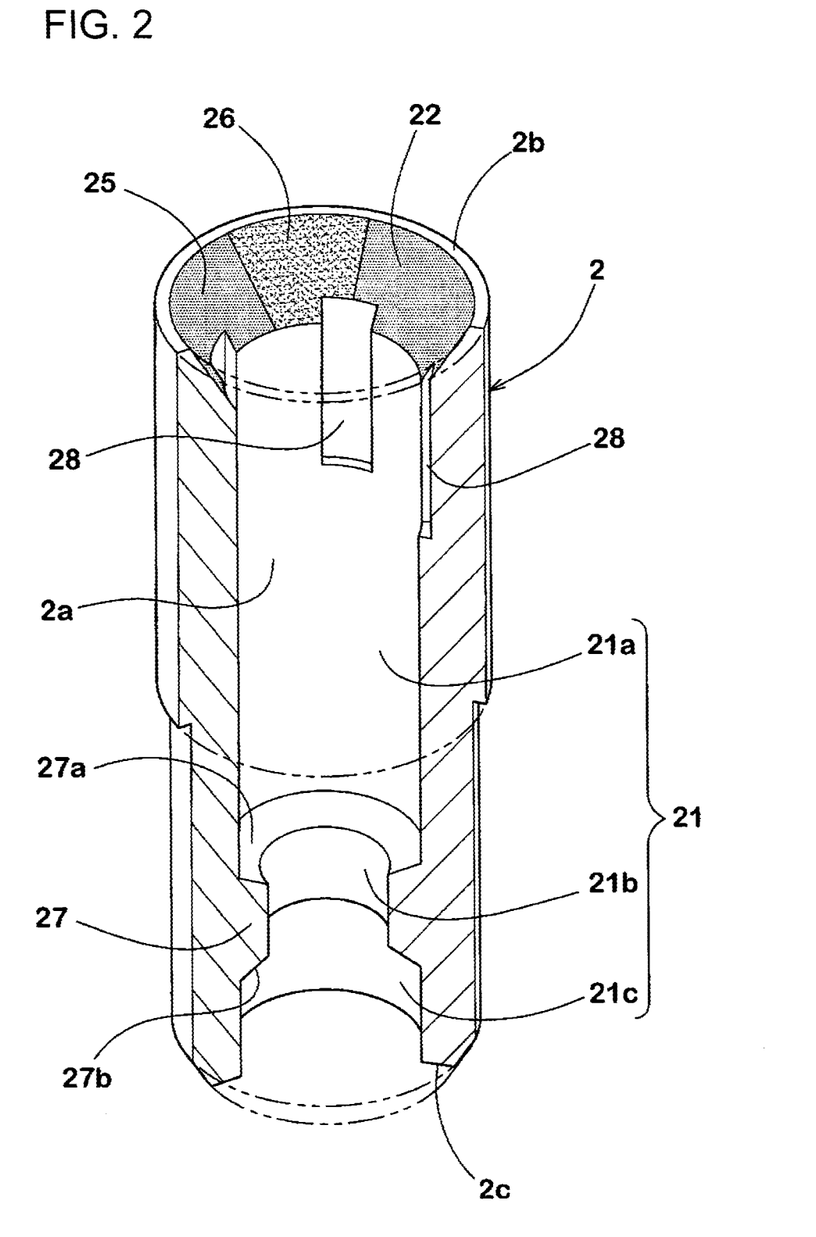
FIG. 2 is a perspective view showing a cylindrical tube installed in the vent piece.

FIG. 2 is a view showing the structure of cylindrical tube 2. Cylindrical tube 2 has through hole 21. Through hole 21 is formed to extend in an axial direction of cylindrical tube 2. In the present embodiment, vent channel 110 and through hole 21 are formed to be coaxial and extend parallel to each other as shown in FIG. 1. Cylindrical tube 2 has first bearing surface 22 at one end (110*a*) of vent piece 110.

Figure 3:
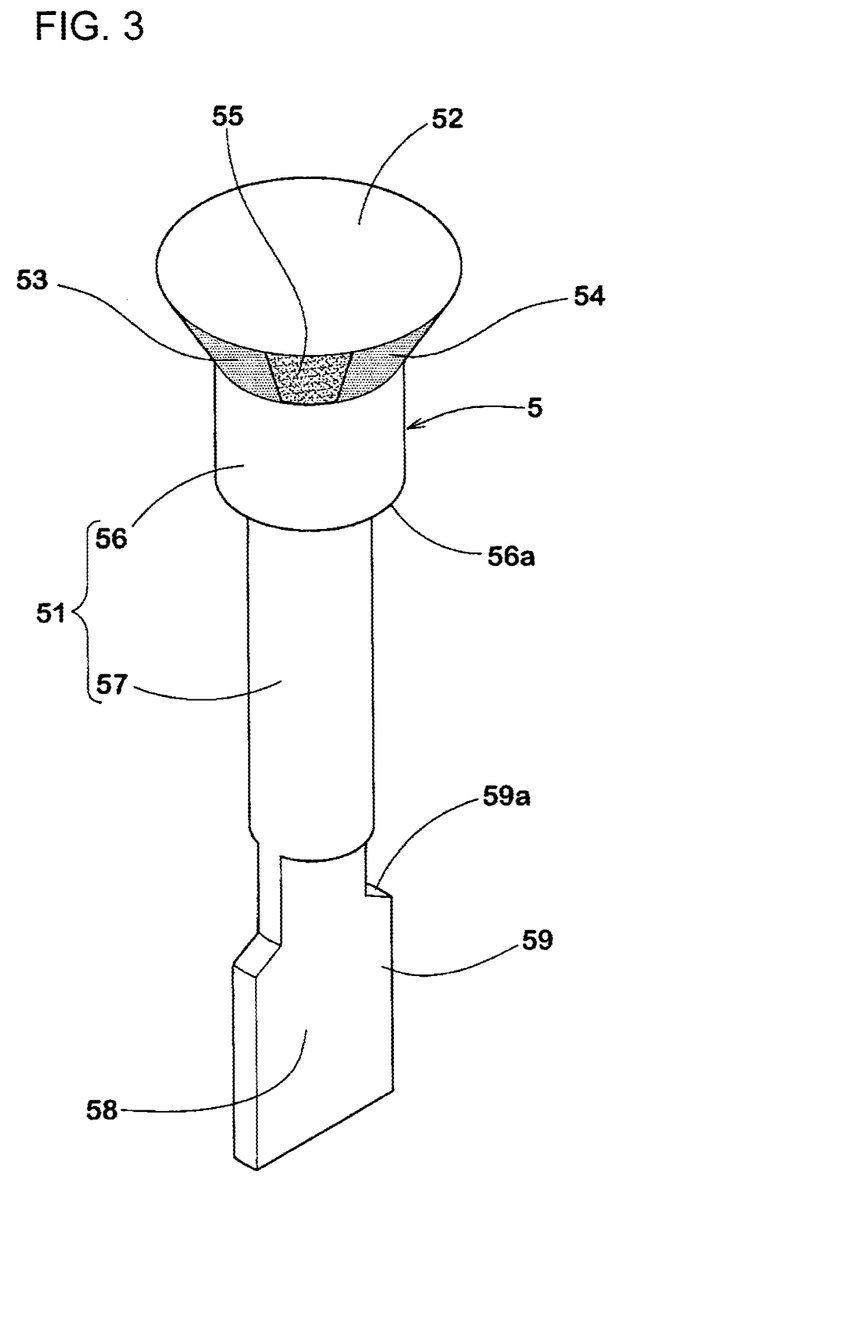
FIG. 3 is a perspective view showing a plug installed in the vent piece.

FIG. 3 is a view showing the structure of plug 5. Plug 5 is supported by inner-side wall (2*a*) of cylindrical tube 2 to be movable in axial direction of through hole 21. Plug 5 is provided with shaft 51 supported by cylindrical tube 2, head 52 formed at the tip of shaft 51, and second bearing surface 53 to face first bearing surface 22 shown in FIG. 2.

Plug 5 is formed to be capable of moving between a closed position to close vent channel 110 when second bearing surface 53 makes contact with first bearing surface 22 and an open position to open vent channel 110 when second bearing surface 53 is separated from first bearing surface 22. In FIG. 1, plug 5 is in an open position.

On first bearing surface 22 of cylindrical tube 2, film 25 is formed to reduce friction between first bearing surface 22 and spew rubber that is pushed out from a raw tire during the vulcanization process and penetrates a gap between first bearing surface 22 and second bearing surface 53 as shown in FIG. 2. Film 25 may also be formed to extend from first bearing surface 22 onto inner-side wall (2a) of cylindrical tube 2.

In the present embodiment, film 25 made of resin, for example, is formed on first bearing surface 22. Film 25 made of resin may be easily formed by coating, for example, on first bearing surface 22.

More specifically, fluororesin is preferred to be used for forming film 25 to reduce friction with spew rubber. Fluororesin is selected, for example, from polytetrafluoroethylene, tetrafluoroethylene-perfluoroalkoxy ethylene copolymer, tetrafluoroethylene-hexafluoropropylene copolymer, ethylene-tetrafluoroethylene copolymer, polychlorotrifluoroethylene and the like.

As shown in FIG. 3, film 54 is formed on second bearing surface 53 of plug 5 to reduce the friction between spew rubber and second bearing surface 53. Film 54 may also be formed to extend from second bearing surface 53 onto shaft 51 of cylindrical tube 2. Since the material for film 54 is the same as that for film 25, its description is omitted here.

In vent piece 1, since film 25 is formed on first bearing surface 22 and film 54 is formed on second bearing surface 53, friction is reduced between film 25 or film 54 and the thin-film spew rubber that has penetrated microscopic gaps between first bearing surface 22 and second bearing surface 53 when plug 5 is in the closed position. Accordingly, thin-film spew rubber is easily removed from first bearing surface 22 and second bearing surface 53, and is discharged from the gap when a vulcanized tire is removed from the mold. As a result, a smooth movement of plug 5 is secured, normal opening/closing functions of vent channel 110 are maintained, and defects in the external appearance of a finished tire are thereby reduced.

In the present embodiment, film 25 is formed on first bearing surface 22 and film 54 is formed on second bearing surface 53, as shown in FIG. 1 and the like. However, that is not the only option, and it is sufficient if at least film 25 or film 54 is formed on at least first bearing surface 22 or second bearing surface 53. Even in such a modified example, the effect of reducing friction by using film 25 or film 54 is partially achieved.

In the first embodiment, film 25 is preferred to be formed to cover first bearing surface 22 entirely. However, it is sufficient if film 25 is formed to cover at least part of first bearing surface 22. The same applies to film 54 on second bearing surface 53. Even in such a modified example, the effect of reducing friction by using film 25 or film 54 is partially achieved.

FIGS. 2 and 3 are partially developed views to show inner-side portions of film 25 and film 54 respectively. As shown in FIG. 2, plated layer 26 is formed on the outer side of first bearing surface 22 and on the inner side of film 25. Plated layer 26 enhances the adhesiveness of film 25. In addition, since first bearing surface 22 is smoothed by plated layer 26, the friction between spew rubber and film 25 is further reduced. Plated layer 26 is preferred to be made of metal containing nickel. Plated layer 26 containing nickel makes first bearing surface 22 even smoother, and thereby contributes to a decrease in friction between the spew rubber and film 25.

In the same manner, plated layer 55 is formed on the outer side of second bearing surface 53 and on the inner side of film 54 as shown in FIG. 3. Plated layer 55 enhances the adhesiveness of film 54. In addition, since second bearing surface 53 is smoothed by plated layer 55, the friction between spew rubber and film 54 is further reduced. The same as above, plated layer 55 is preferred to be made of metal containing nickel.

As shown in FIG. 3, second bearing surface 53 is formed to taper from the cavity space 101 side toward the exterior space 102 side. In addition, first bearing surface 22 is formed to be in a cone shape corresponding to second bearing surface 53 as shown in FIG. 2. When first bearing surface 22 abuts second bearing surface 53, vent channel 110 is closed.

As shown in FIG. 1, vent piece 1 is further provided with coil spring 7 capable of moving plug 5 toward the open position on the cavity space 101 side. Coil spring 7 is wound around shaft 51 of plug 5. Any other mechanism may also be employed as long as it is capable of moving plug 5 toward the open position on the cavity space 101 side. For example, springs other than a coil spring, and elastic bodies such as rubber may be used.

As shown in FIG. 2, cylindrical tube 2 has inner-side wall (2a), first locking member 27, and ventilation portion 28. Part of inner-side wall (2a) along an axial direction of cylindrical tube 2 protrudes inward to form first locking member 27. First locking member 27 is formed to extend along the entire circumferential direction of inner-side wall (2a), but it may also be formed along only part of the above circumferential direction. Because of first locking member 27 formed on inner-side wall (2a) of cylindrical tube 2, through hole 21 is divided into first hole portion (21a), second hole portion (21b) and third hole portion (21c) arranged in an axial direction. First hole portion (21a) opens onto first bearing surface 22. Second hole portion (21b) is surrounded by first locking member 27. Accordingly, the inner diameter of second hole portion (21b) is smaller than the inner diameter of any of first hole portion (21a) and third hole portion (21c). Third hole portion (21c) opens at end surface (2c) of cylindrical tube 2.

Ventilation portion 28 is formed on the inner-side wall (2a) of cylindrical tube 2. Multiple ventilation portions 28 are formed along axial direction of cylindrical tube 2. When plug 5 is loaded onto cylindrical tube 2 and is at the open position, ventilation portion 28 connects the gap between first bearing surface 22 and second bearing surface 53 to first hole portion (21a) of through hole 21. Positions, numbers and shapes of ventilation portions 28 are respectively set as desired. If sufficient ventilation is secured between inner-side wall (2a) and shaft 51, ventilation portion 28 may be omitted.

As shown in FIG. 3, shaft 51 of plug 5 has first shaft 56 and second shaft 57. First shaft 56 is formed to extend continuously in an axial direction from second bearing surface 53. First shaft 56 is accommodated in first hole portion (21a) of through hole 21.

Second shaft 57 is formed to protrude in an axial direction from end surface (56a) of first shaft 56. The outer diameter of second shaft 57 is smaller than that of first shaft 56. Coil spring 7 shown in FIG. 1 is installed on the radially outer side of second shaft 57. Second shaft 57 and coil spring 7 are accommodated in first hole portion (21a) of through hole 21.

As described above, plug 5 is set to be movable in axial direction of cylindrical tube 2. Thus, first hole (21a), second shaft 57 and coil spring 7 are set to have a gap at such a degree that allows air ventilation.

One end of coil spring 7 abuts end surface (56a) of first shaft 56, and the other end abuts first end surface (27a) of first locking member 27 shown in FIG. 2. Accordingly, coil spring 7 is compressed to generate power.

As shown in FIG. 3, plug 5 is further provided with flat-plate portion 58. Flat-plate portion 58 is formed to extend from the tip of second shaft 57 in an axially outward direction. Flat-plate portion 58 is accommodated in second hole portion (21b) and third hole portion (21c) of through hole 21.

First shaft 56 and second shaft 57 or second shaft 57 and flat-plate portion 58 may be formed using other members respectively. For example, those members may be assembled by screws or the like. As shown in FIG. 1, since the tip of flat-plate portion 58 protrudes from cylindrical tube 2, the flat-plate portion can rotate with respect to cylindrical tube 2 or first shaft 56.

Flat-plate portion 58 has protrusion 59 on its tip. Protrusion 59 protrudes in a radial direction of shaft 51. Protrusion 59 is accommodated in third hole portion (21c) of through hole 21.

As shown in FIG. 1, when plug 5 is at the open position, end surface (59a) of protrusion 59 abuts second end surface (27b) of first locking member 27, thereby limiting the protruding amount of head 52 of plug 5 from end surface (2b) of cylindrical portion 2.

Figure 4:
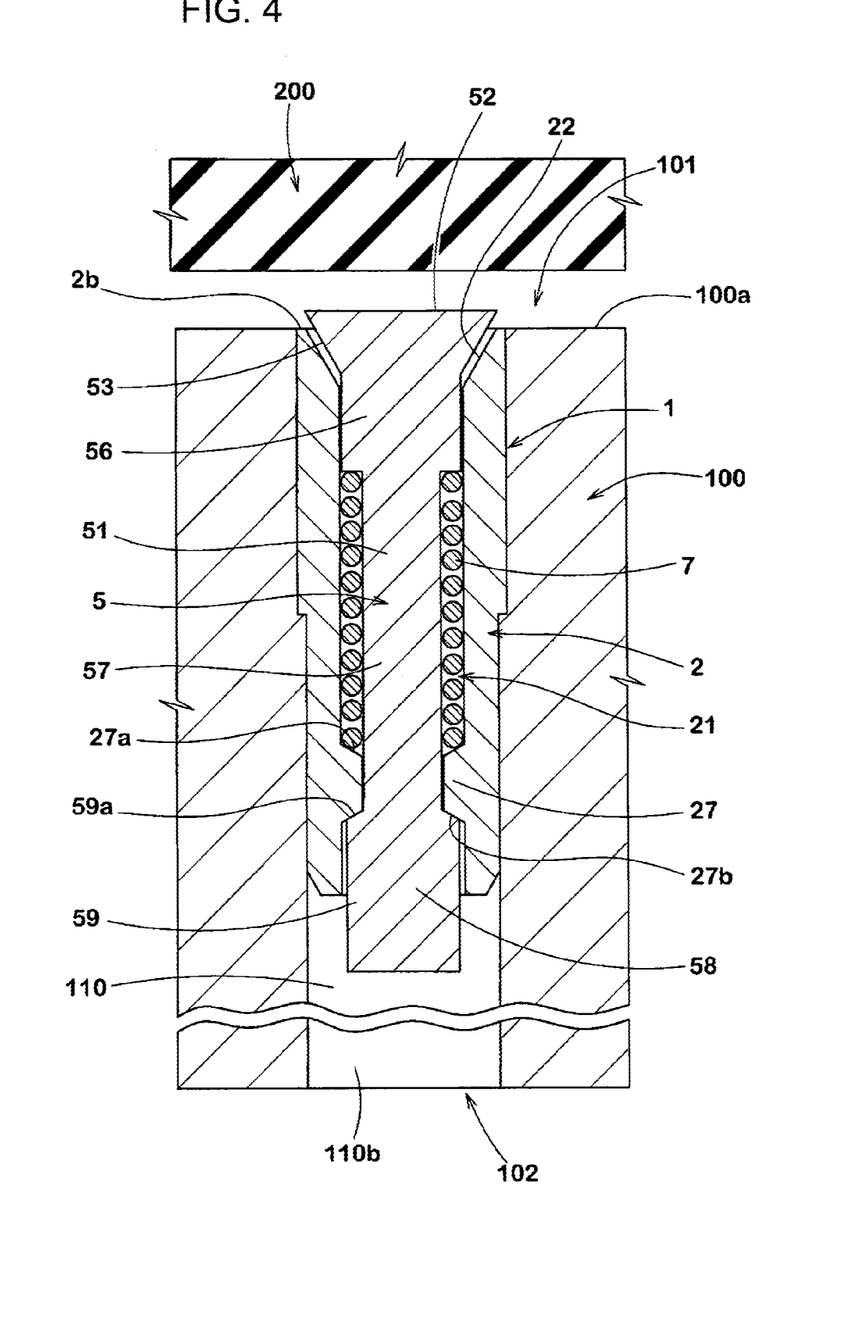
FIG. 4 is a cross-sectional view showing a state of the vent piece at an initial vulcanization stage.
Figure 5:
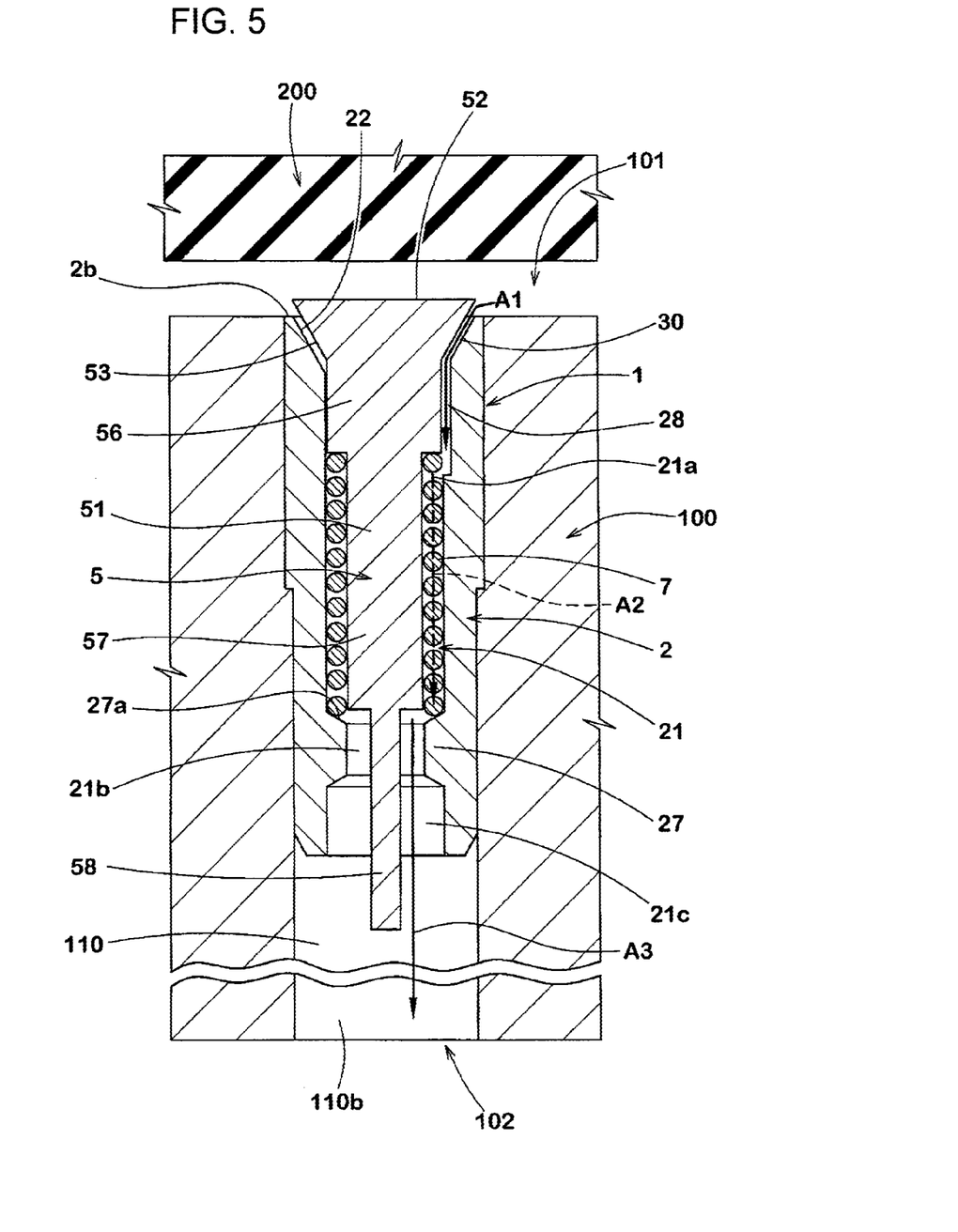
FIG. 5 is another cross-sectional view of the state shown in FIG. 4.

FIGS. 4 and 5 each show vent piece 1 at an initial vulcanization stage when tire vulcanization mold 100 is closed. FIG. 4 is a view of a cross section parallel to flat-plate portion 58. FIG. 5 is a view that includes ventilation portion 28 and shows a cross section perpendicular to flat-plate portion 58. During the initial stage of vulcanization, there is a gap between raw tire 200 and tire molding surface (100a) of tire vulcanization mold 100. Air is trapped in the gap.

At that time, the degree of head 52 of plug 5 protruding from end surface (2b) of cylindrical tube 2 is limited, since end surface (59a) abuts second end surface (27b). Accordingly, raw tire 200 is separated from tire molding surface (100a).

In addition, as shown in FIG. 5, gap 30 is formed between first bearing surface 22 and second bearing surface 53. Thus, cavity space 101 and exterior space 102 of tire vulcanization mold 100 are connected by way of gap 30, ventilation portion 28, through hole 21 and vent channel 110. Namely, plug 5 is in the open position. Accordingly, the air trapped in the gap between raw tire 200 and tire molding surface (100a) of tire vulcanization mold 100 is discharged to exterior space 102 through gap 30, ventilation portion 28, through hole 21 and vent channel 110 in that order, as shown by arrows (A1) through (A3). As a result, defects in the external appearance of a finished tire are reduced.

Figure 6:
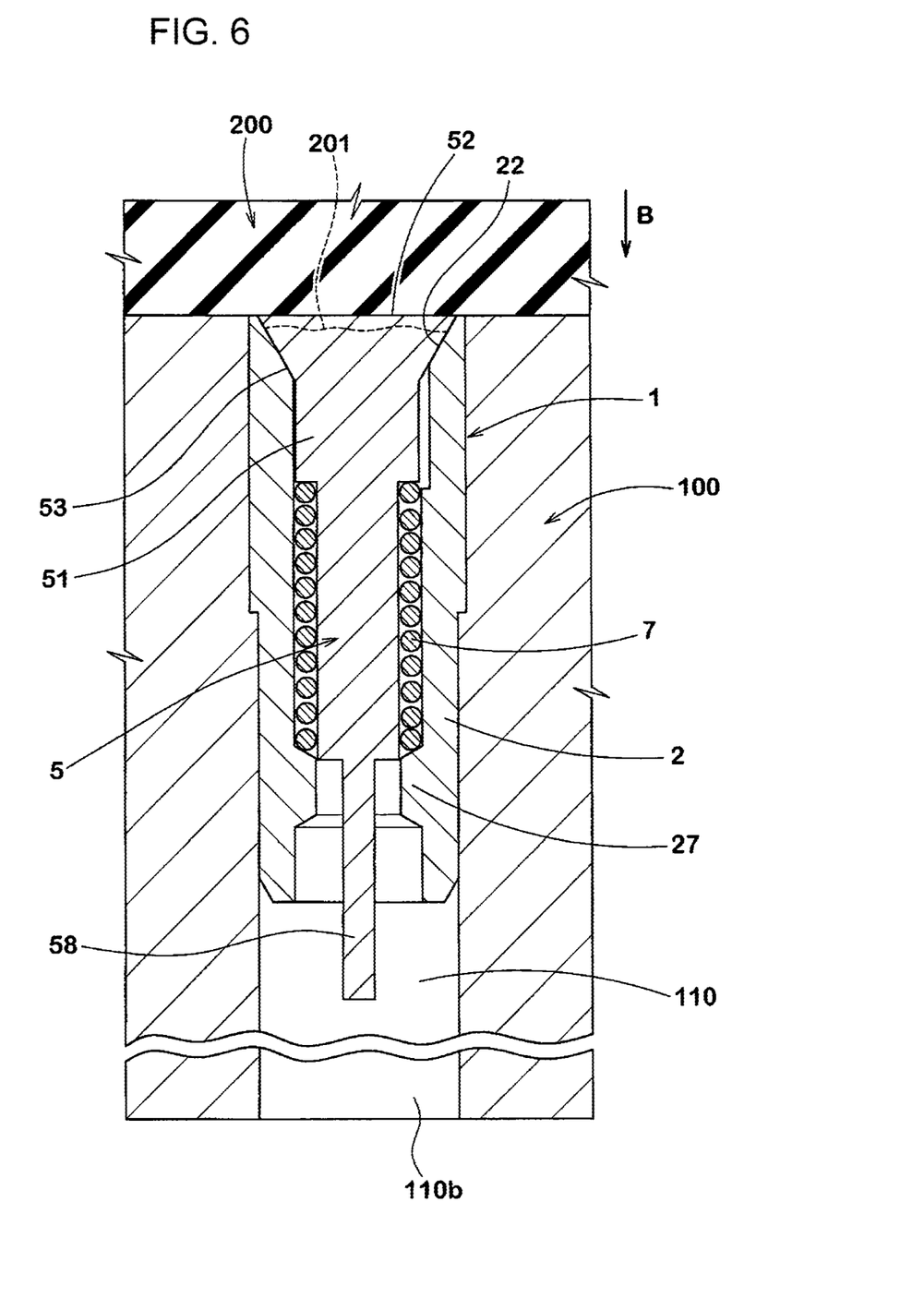
FIG. 6 is a cross-sectional view showing the vent piece during vulcanization molding of a raw tire.

FIG. 6 shows vent piece 1 when raw tire 200 is vulcanization-molded by tire vulcanization mold 100. During vulcanization, great pressure is exerted on raw tire 200 from the inner side toward the outer side, and raw tire 200 expands as shown by arrow (B). As raw tire 200 expands, it abuts head 52 of plug 5. Raw tire 200 further expands and presses plug 5 toward other end (110b) of vent channel 110. Accordingly, plug 5 moves toward other end (110b) until first bearing surface 22 abuts second bearing surface 53. When first bearing surface 22 abuts second bearing surface 53, the connection is broken between cavity space 101 of tire vulcanization mold 100 and exterior space 102; namely, plug 5 moves to a closed position.

As described above, when plug 5 moves, first bearing surface 22 abuts second bearing surface 53 and vent channel 110 is closed, thereby suppressing the formation of spew rubber. However, when observed from a microscopic viewpoint, a slight gap exists between first bearing surface 22 and second bearing surface 53. Thus, when great pressure is applied from the inner surface of raw tire 200 toward the outer side during the vulcanization process, thin-film spew rubber 201 is formed as shown by a broken line in FIG. 6.

Figure 7:
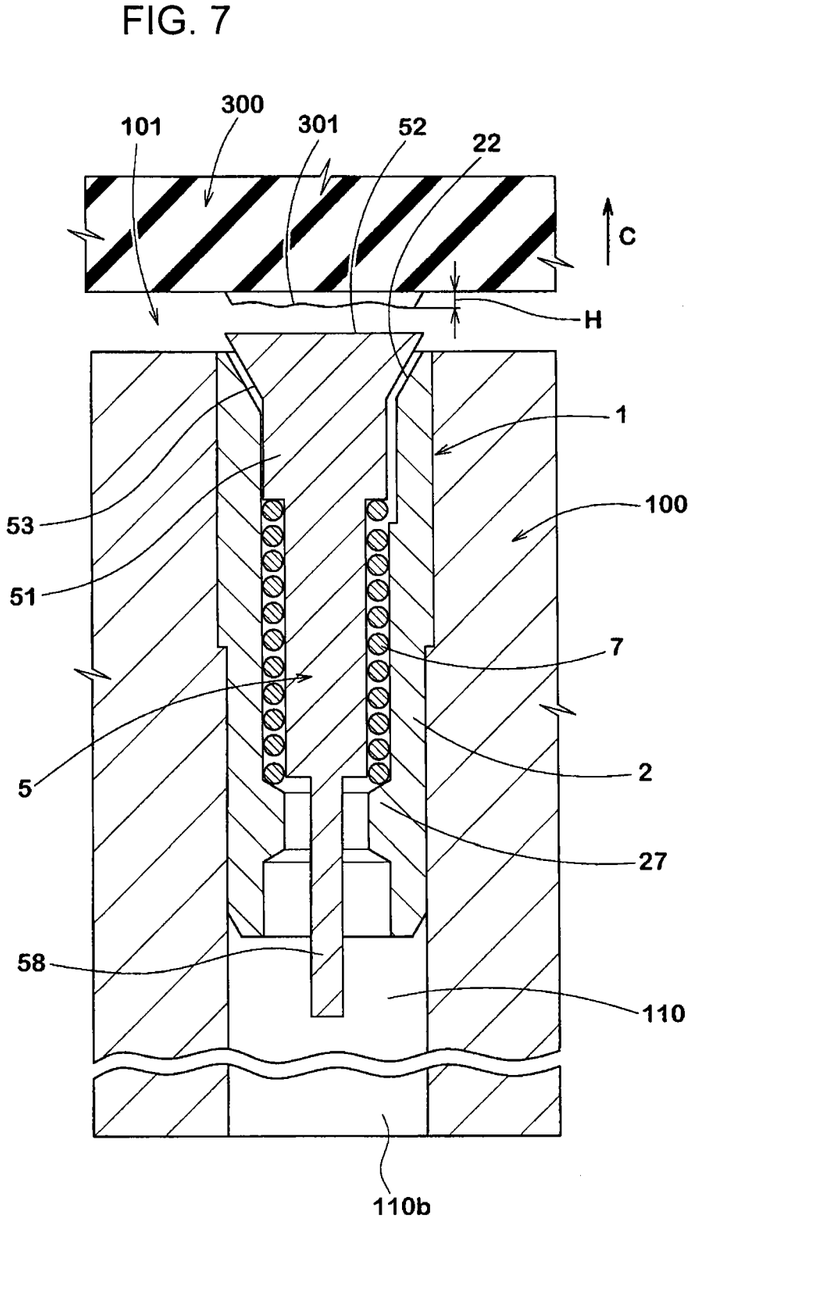
FIG. 7 is a cross-sectional view showing the vent piece when a vulcanized tire is removed from the tire vulcanization mold.

FIG. 7 shows vent piece 1 when vulcanized tire 300 is removed from tire vulcanization mold 100. Raw tire 200 shown in FIG. 6 becomes vulcanized tire 300, which is removed from the mold as shown by arrow (C). When vulcanized tire 300 is removed from the mold, spew rubber 301 is removed together with vulcanized tire 300. In the present embodiment, since film 25 on first bearing surface 22 and film 54 on second bearing surface 53 are respectively formed, friction is reduced between spew rubber 301 and first bearing surface 22 or second bearing surface 53. Thus, spew rubber 301 is easily removed from first bearing surface 22 and second bearing surface 53. Here, spew rubber 301 protrudes only slightly from the surface of vulcanized tire 300, thus causing hardly any adverse effect on the external appearance of vulcanized tire 300.

Figure 8:
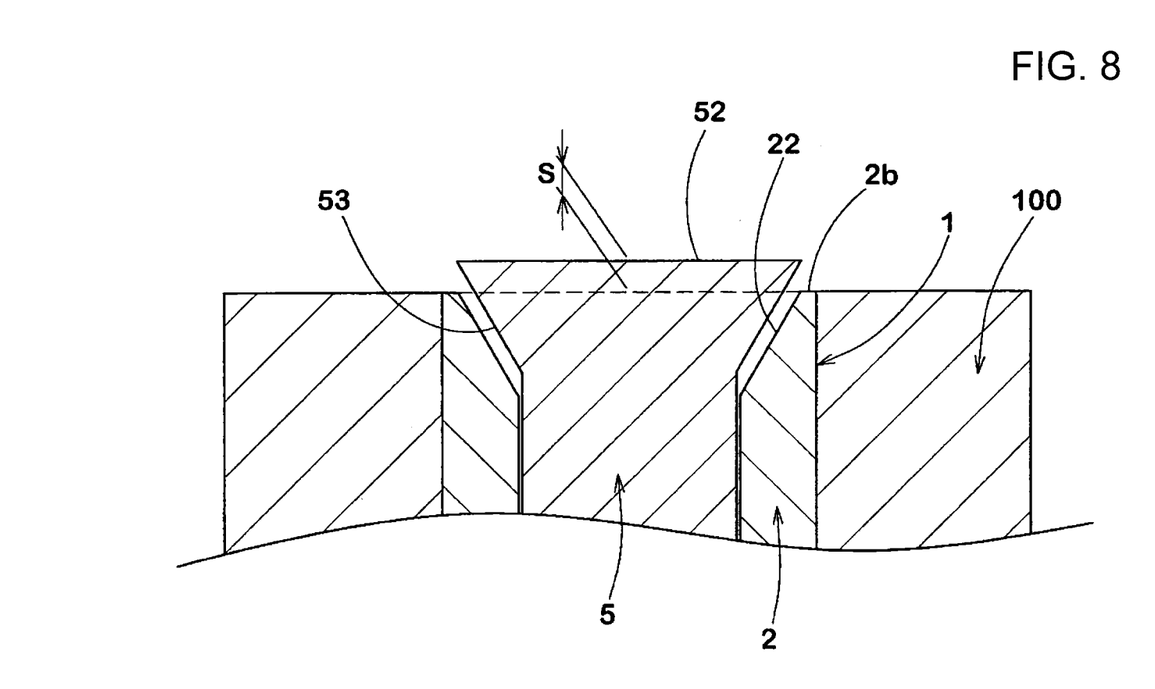
FIG. 8 is a cross-sectional view showing open and closed positions of the plug.

In FIG. 8, the open position of plug 5 is shown by a solid line, and the closed position of plug 5 is shown by a broken line. To suppress formation of spew rubber 301 between first bearing surface 22 and second bearing surface 53, the maximum stroke (S) between the open and closed positions of plug 5 is preferred to be 2 mm or less. A maximum stroke (S) that exceeds 2 mm increases the maximum amount of protrusion (H) of spew rubber 301 shown in FIG. 7, and may result in such a situation that spew rubber 301 adheres to first bearing surface 22 or second bearing surface 53, thereby remaining in the gap between first bearing surface 22 and second bearing surface 53. Accordingly, the smooth movement of plug 5 may be hindered.

So far, vent piece 1 and tire vulcanizing mold 100 equipped with vent piece 1 have been described in detail. However, the present invention is not limited to the above embodiments, and various modifications are possible.

EXAMPLES

Test vent pieces with the basic structure shown in FIG. 1 were prepared according to the specifications for Comparative Example and Example 1~5 respectively. Each of the test vent pieces is installed on one tire vulcanization mold. After 1,500 tires were vulcanized, each vent piece was tested for functionality. The test was conducted as follows.

Rate of Malfunction Causing Complete Closure

Regarding vent pieces in Comparative Example and Example 1~5, the number of vent pieces was counted in a situation where spew rubber was adhered to the first bearing surface and second bearing surface, causing the plug to be adhered in a completely closed position. The results are shown by the rate (%) of malfunction. The smaller the value is, the smoother is the movement of the plug and the better is the capability of discharging air.

Rate of Malfunction Causing Incomplete Closure

Regarding vent pieces in Comparative Example and Example 1~5, the number of vent pieces was counted in a situation where spew rubber was stuck between the first bearing surface and second bearing surface, causing the plug to be unable to reach the closed position. The results are shown by the rate (%) of malfunction. The smaller the value is, the smoother is the movement of the plug and the better is the capability of discharging air.

TABLE 1

|  | Comp. Example | Example 1 | Example 2 | Example 3 | Example 4 | Example 5 |
|---|---|---|---|---|---|---|
| Film on 1st bearing surface | None | Fluororesin | Fluororesin | Fluororesin | Fluororesin | Fluororesin |
| Plated layer on 1st bearing surface | None | None | None | Nickel | None | Nickel |
| Film on 2nd bearing surface | None | None | Fluororesin | Fluororesin | Fluororesin | Fluororesin |
| Plated layer on 2nd bearing surface | None | None | None | Nickel | None | Nickel |
| Maximum stroke (S) (mm) | 0.3 | 0.3 | 0.3 | 0.3 | 0.2 | 0.2 |
| Rate of malfunction causing complete closure (%) | 49 | 44 | 39 | 12 | 25 | 8 |
| Rate of malfunction causing incomplete closure (%) | 27 | 24 | 21 | 12 | 24 | 14 |

As shown in Table 1, it was found that vent pieces of Example 1~5 each exhibited a smoother movement of the plug than that in Comparative Example, and that the air discharge capability was significantly enhanced.

When the vent piece in JP2012-139830A is used, rubber that has penetrated a gap between the cylindrical tube and the plug may remain in the gap to hinder the smooth movement of the plug. Accordingly, it is feared that the vent channel may be stuck closed and may cease functioning. In such a case, the air trapped between raw rubber and the tire vulcanization mold will not be discharged from the vent channel in a process for vulcanizing the subsequent raw rubber, thus causing defects in the external appearance of finished tires.

A vent piece according to an embodiment of the present invention is capable of maintaining normal opening/closing functions of a vent channel by securing the smooth movement of a plug so that defects in the external appearance of finished tires are reduced.

A vent piece according to one aspect of the present invention is to be installed in a vent channel, where one end is connected to a cavity space of a tire vulcanization mold while the other end is connected to the exterior space of the tire vulcanization mold.

Such a vent piece has a cylindrical tube which is installed at the one end of the vent channel and which has a through hole extending in an axial direction; and a plug loaded in the through hole to be movable in axial direction. The cylindrical tube has a first bearing surface. The plug has a second bearing surface facing the first bearing surface, and is movable between a closed position where the second bearing surface makes contact with the first bearing surface to close the vent channel and an open position where the second bearing surface is separated from the first bearing surface to open the vent channel. A film to reduce friction is formed on at least part of at least the first bearing surface or the second bearing surface.

In a vent piece according to an embodiment of the present invention, the film is preferred to be formed on both the first bearing surface and the second bearing surface.

In a vent piece according to an embodiment of the present invention, the second bearing surface is preferred to have a shape tapering from the cavity space side toward the exterior space side, while the first bearing surface is formed to have a cone shape corresponding to the second bearing surface.

In a vent piece according to an embodiment of the present invention, the film is preferred to contain fluororesin.

In a vent piece according to an embodiment of the present invention, a plated layer is preferred to be formed on the inner side of the film.

In a vent piece according to an embodiment of the present invention, the plated layer is preferred to contain nickel.

A vent piece according to an embodiment of the present invention is preferred to be further provided with a mechanism capable of moving the plug toward the open position.

In a vent piece according to an embodiment of the present invention, the maximum stroke of the plug between the open position and the closed position is preferred to be 2 mm or less.

A second aspect of the present invention is a tire vulcanization mold characterized by a vent piece according to an embodiment of the present invention installed therein.

A third aspect of the present invention is a tire characterized by being manufactured using the above tire vulcanization mold.

A vent piece according to an embodiment of the present invention has a cylindrical tube installed at one end of the vent channel in a tire vulcanization mold, and a plug loaded in a through hole of the cylindrical tube to be movable in axial direction. The cylindrical tube has a first bearing surface and the plug has a second bearing surface facing the first bearing surface. The plug is movable from an open position to open the vent channel by separating the second bearing surface from the first bearing surface to a closed position to close the vent channel by making the second bearing surface touch the first bearing surface. At the open position during the initial stage of vulcanization, the air trapped between raw rubber and the tire vulcanization mold is discharged from the vent channel to the exterior space of the vulcanization mold. Then, as the raw rubber expands, the plug moves to the closed position so that formation of spew rubber is suppressed.

In addition, a film for reducing friction is formed on at least part of at least the first bearing surface or the second bearing surface. Thus, when the plug is in the closed position, friction is reduced between the film and thin-film spew rubber that has penetrated a gap between the first bearing surface and the second bearing surface. As a result, when the vulcanized tire is removed from the mold, the thin-film spew rubber is easily removed from the first bearing surface or the second bearing surface and is discharged from the gap. Thus, the smooth movement of the plug is secured, normal opening/closing functions of the vent channel are maintained, and defects are reduced in the external appearance of the finished tire.

The above vent piece is installed in a tire vulcanization mold according to the second aspect of the present invention. Thus, the same as above, the smooth movement of the plug is secured, normal opening/closing functions of the vent channel are maintained, and defects are reduced in the external appearance of the finished tire.

A tire according to the second aspect of the present invention is unlikely to have a defective external appearance.

Obviously, numerous modifications and variations of the present invention are possible in light of the above teachings. It is therefore to be understood that within the scope of the appended claims, the invention may be practiced otherwise than as specifically described herein.

What is claimed is:

1. A vent piece for a vent channel of a tire vulcanization mold, comprising:
   a cylindrical tube configured to be installed in a cavity end portion of a vent channel of a tire vulcanization mold and having a through hole extending in an axial direction of the vent channel; and
   a plug positioned in the through hole of the cylindrical tube and configured to move in the axial direction between a closed position and an open position,
   wherein the cylindrical tube has a first bearing surface, the plug has a second bearing surface facing the first bearing surface of the cylindrical tube such that the second bearing surface of the plug makes contact with the first bearing surface to close the vent channel in the closed position and the second bearing surface is separated from the first bearing surface to open the vent channel in the open position, and each of the first bearing surface and the second bearing surface has a plated layer and a film formed on the plated layer at least on a portion of each of the first bearing surface and the second bearing surface such that the film reduces friction between the first bearing surface and the second bearing surface.

2. The vent piece according to claim 1, wherein the plated layer comprises nickel, the film comprises fluororesin, and the plug is configured to move between the open position and the closed position at the maximum stroke of 3 mm or less.

3. The vent piece according to claim 1, wherein the plug is formed such that the second bearing surface is tapering from a cavity space side toward an exterior space side of the vent channel in the vulcanization mold, and the first bearing surface of the cylindrical tube has a cone shape corresponding to the second bearing surface.

4. The vent piece according to claim 1, wherein the film comprises fluororesin.

5. The vent piece according to claim 1, wherein each of the first bearing surface and the second bearing surface has the plated layer formed entirely on the first bearing surface and the second bearing surface such that the film is formed entirely on the plated layer.

6. The vent piece according to claim 5, wherein the plated layer comprises nickel.

7. The vent piece according to claim 1, further comprising:
   a moving mechanism configured to move the plug toward the open position.

8. The vent piece according to claim 1, wherein the plug is configured to move between the open position and the closed position at the maximum stroke of 2 mm or less.

9. A tire vulcanization mold, comprising the vent piece according to claim 1.

10. The vent piece according to claim 1, wherein the cylindrical tube has at least one ventilation portion formed on an inner-side wall of the cylindrical tube along an axial direction of the cylindrical tube.

11. The vent piece according to claim 2, wherein the plug is formed such that the second bearing surface is tapering from a cavity space side toward an exterior space side of the vent channel in the vulcanization mold, and the first bearing surface of the cylindrical tube has a cone shape corresponding to the second bearing surface.

12. The vent piece according to claim 10, wherein the film comprises fluororesin.

13. The vent piece according to claim 2, wherein each of the first bearing surface and the second bearing surface has the plated layer formed entirely on the first bearing surface and the second bearing surface such that the film is formed entirely on the plated layer.

14. The vent piece according to claim 8, wherein the plated layer comprises nickel.

15. The vent piece according to claim 2, wherein the plug is configured to move between the open position and the closed position at the maximum stroke of 2 mm or less.

16. The vent piece according to claim 10, wherein the film comprises fluororesin, and the plated layer comprises nickel.

17. The vent piece according to claim 1, wherein the film comprises resin.

18. The vent piece according to claim 1, further comprising:
   an elastic body configured to move the plug toward the open position.

19. The vent piece according to claim 1, further comprising:
   a spring configured to move the plug toward the open position.

20. A method for manufacturing a tire, comprising:
   placing a raw tire in a vulcanization mold comprising a vent piece; and
   vulcanizing the raw tire in the tire vulcanization mold such that air trapped between the raw tire and the tire vulcanization mold is discharged through the vent piece,
   wherein the vent piece of the tire vulcanization mold comprises a cylindrical tube configured to be installed in a cavity end portion of a vent channel of the tire vulcanization mold and having a through hole extending in an axial direction of the vent channel, and a plug positioned in the through hole of the cylindrical tube and configured to move in the axial direction between a closed position and an open position, the cylindrical tube has a first bearing surface, the plug has a second bearing surface facing the first bearing surface of the cylindrical tube such that the second bearing surface of the plug makes contact with the first bearing surface to close the vent channel in the closed position and the second bearing surface is separated from the first bearing surface to open the vent channel in the open position, and each of the first bearing surface and the second bearing surface has a plated layer and a film formed on the plated layer at least on a portion of each of the first bearing surface and the second bearing surface such that the film reduces friction between the first bearing surface and the second bearing surface.

* * * * *